US010599259B2

(12) United States Patent
Mukherjee et al.

(10) Patent No.: US 10,599,259 B2
(45) Date of Patent: Mar. 24, 2020

(54) VIRTUAL REALITY / AUGMENTED REALITY HANDHELD CONTROLLER SENSING

(71) Applicant: Google LLC, Mountain View, CA (US)

(72) Inventors: Debanjan Mukherjee, Mountain View, CA (US); Basheer Tome, Mountain View, CA (US); Sarnab Bhattacharya, Mountain View, CA (US); Bhaskar Vadathavoor, Mountain View, CA (US); Shiblee Imtiaz Hasan, Santa Clara, CA (US); Chun Yat Frank Li, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/111,702

(22) Filed: Aug. 24, 2018

(65) Prior Publication Data

US 2019/0155439 A1 May 23, 2019

Related U.S. Application Data

(60) Provisional application No. 62/588,706, filed on Nov. 20, 2017.

(51) Int. Cl.
*G06F 3/041* (2006.01)
*G06F 3/044* (2006.01)
(Continued)

(52) U.S. Cl.
CPC ............ *G06F 3/0416* (2013.01); *G06F 3/016* (2013.01); *G06F 3/044* (2013.01); *G06F 3/046* (2013.01);
(Continued)

(58) Field of Classification Search
CPC ........ G06F 3/0416; G06F 3/044; G06F 3/016; G06F 2203/04105; G06F 2203/04101;
(Continued)

(56) References Cited

U.S. PATENT DOCUMENTS 9,218,073 B1 12/2015 Kremin et al.
9,459,746 B2 10/2016 Rosenberg et al.
(Continued)

FOREIGN PATENT DOCUMENTS

WO  WO 2016/140924  * 9/2016  ............... G06F 3/03

OTHER PUBLICATIONS

International Search Report and Written Opinion dated Jan. 3, 2019 for corresponding International Application No. PCT/US2018/055808, 15 pages.

*Primary Examiner* — Andrew Sasinowski

(57) ABSTRACT

A method that includes employing several sensors associated with a handheld controller, where each of the sensors is made of one of a hover, touch, and force/pressure sensor, and generating, by one or more of the sensors, sensor data associated with the position of a user's hand and finger in relation to the handheld controller. The method continues with combining the sensor data from several sensors to form aggregate sensor data, sending the aggregate sensor data to a processor, and generating an estimated position of the user's hand and fingers based on the aggregate sensor data.

20 Claims, 6 Drawing Sheets

(51) Int. Cl.
    *G06F 3/01*       (2006.01)
    *G06F 3/046*      (2006.01)

(52) U.S. Cl.
    CPC ........ *G06F 3/0443* (2019.05); *G06F 3/04144* (2019.05); *G06F 3/0418* (2013.01); *G06F 2203/04101* (2013.01); *G06F 2203/04105* (2013.01); *G06F 2203/04106* (2013.01); *G06F 2203/04108* (2013.01)

(58) Field of Classification Search
    CPC . G06F 2203/04108; G06F 2203/04106; G06F 3/0418; G06F 3/04144; G06F 3/0443; G06F 3/046
    See application file for complete search history.

(56) References Cited

U.S. PATENT DOCUMENTS

| | | |
|---|---|---|
| 2002/0015024 A1 | 2/2002 | Westerman et al. |
| 2003/0067451 A1 | 4/2003 | Tagg et al. |
| 2007/0057922 A1 | 3/2007 | Schultz et al. |
| 2014/0218642 A1* | 8/2014 | Iwami ................. G06F 3/044 349/12 |
| 2014/0267002 A1* | 9/2014 | Luna .................. H04M 1/7253 345/156 |
| 2016/0162031 A1 | 6/2016 | Westerman et al. |
| 2016/0170532 A1* | 6/2016 | Suwald ................. G06F 3/044 345/174 |
| 2016/0291737 A1 | 10/2016 | Hirakawa |
| 2016/0361638 A1 | 12/2016 | Higgins et al. |
| 2017/0097689 A1* | 4/2017 | Miller ................... G06F 1/1624 |
| 2018/0067545 A1 | 3/2018 | Provancher et al. |

\* cited by examiner

VIRTUAL REALITY / AUGMENTED REALITY HANDHELD CONTROLLER SENSING

CROSS REFERENCE TO RELATED APPLICATIONS

This application is related to U.S. Provisional Patent Application 62/588,706, entitled "VIRTUAL REALITY/ AUGMENTED REALITY HANDHELD CONTROLLER SENSING" and filed on Nov. 20, 2017, the entirety of which is incorporated by reference herein.

BACKGROUND

Field of the Disclosure

The present disclosure relates generally to virtual reality/ augmented reality (VR/AR) systems, and more specifically to handheld controls for VR/AR systems.

Description of the Related Art

Handheld controllers are used in a variety of applications, including controlling media devices, remotely-controlled vehicles, and VR/AR systems. For example, in one application the handheld controller allows a user to move their hands and fingers to manipulate buttons and sensors to interact with objects within a VR/AR environment. To support flexible interaction with the VR/AR environment, various types of sensors can be employed within the handheld controller, including, but not limited to, contact switches, mechanical buttons, slider switches, and the like, which provides on/off and analog signals as inputs to the VR/AR system. However, existing handheld controller designs do not support sufficient immersion in the VR/AR environment, and therefore negatively impact the user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate methods and apparatus for sensors placed on a handheld controller for use with VR/AR systems. The multiple sensors can employ several different modalities including capacitive sensing, inductive sensing, and haptic feedback to the user, and can be positioned on the handheld controller in geometric patterns such as circles or hexagons. In some embodiments, the system employing the handheld controller uses data from multiple sensors concurrently (also known as aggregate sensor data) to establish the location of a user's fingers and hands. This allows the system to use triangulation to determine the user's fingers position, and also improves the resolution and sensitivity of the sensors. In addition, inductive sensing can be used to improve the accuracy of capacitive sensing by detecting when a user's fingers are actually in contact with a sensor verses hovering over the sensor. In yet other embodiments, the palm of the user's hand provides a force to the handheld controller by squeezing, where the squeezing force can be detected by a sensor located in the grip of the handheld controller.

The handheld controller as described herein uses several types of sensors, including, but not limited to mechanical switch-type sensors, hover sensors, touch sensors, and force/ pressure sensors. In at least some embodiments, the handheld controller uses a hover and touch sensor employing capacitive sensing. Capacitive sensing uses self-capacitive measurements and is employed as a proximity sensor and also as a contact sensor when the finger is near or in contact with the sensor. Another type of sensor is a force/pressure sensor that uses inductive sensing where a finger applies varying levels of pressure to the sensor. The pressure deflects elements within the sensor and provides a measure of variable force corresponding to the pressure applied. In some embodiments, sensors employing inductive sensing can also produce haptic feedback in response to pressure applied to the sensor. In the VR/AR environment, employing these hover, touch, and force sensors enhances the VR/AR experience by allowing for greater control of, and interaction with, objects within the VR/AR world. In one example, employing hover and force sensing allows the system to more precisely sense the position of the user's hand and fingers on the handheld controller. In another example, hover sensing and haptic feedback enables users to see in the VR/AR world the object they are about to touch before they actually make contact.

Figure 1:
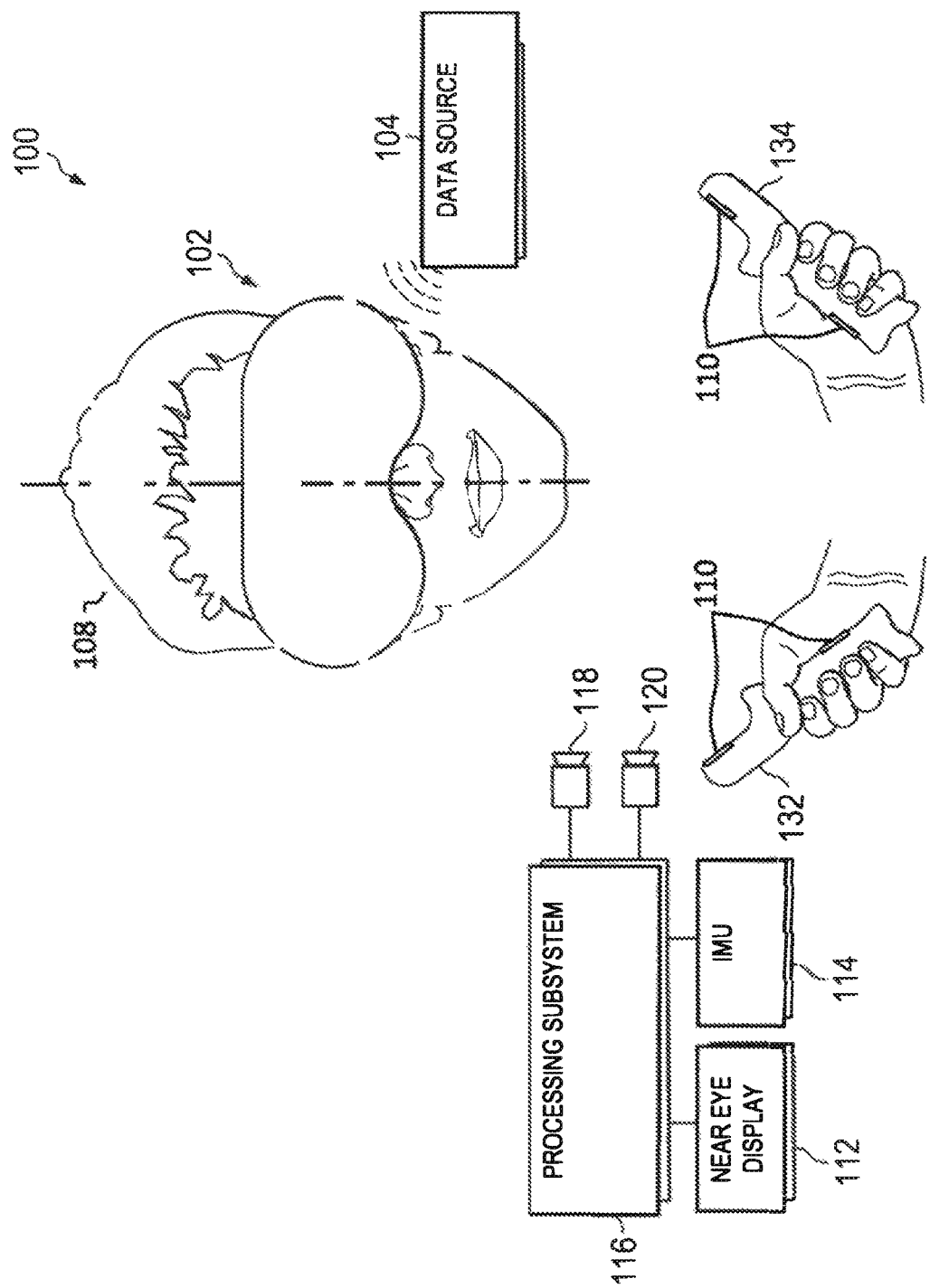
FIG. 1 is a diagram illustrating a VR/AR system that uses a plurality of sensors located on multiple handheld controllers in accordance with some embodiments.

FIG. 1 is a diagram illustrating a VR/AR system 100 that uses a plurality of sensors 110 located on the two handheld controllers 132, 134 in accordance with some embodiments. FIG. 1 illustrates the VR/AR system 100 for providing VR or AR content to a user in accordance with at least one embodiment of the present disclosure. The VR/AR system 100 includes a HMD device 102 and one or more external data sources 104. The HMD device 102 includes a housing 106 to mount on a head 108 of a user. The housing 106 contains various electronic and optical components used to display visual content to the user, output audio content to the user, and track a pose (position and orientation) of the HMD device 102, such as one or more near-eye displays 112, an inertial measurement unit (IMU) 114 having one or more inertia/movement-based sensors, a processing subsystem (processor) 116, and one or more image sensors 118, 120, as well as one or more audio speakers, lenses, or other optical elements, and the like (not shown).

As a general overview of the operation of the VR/AR system 100, the HMD device 102 operates to display visual content via the one or more near-eye displays 112 and output audio content via one or more speakers (not shown). The visual and audio content are sourced from the one or more external data sources 104, which may include, for example, a remote server, a local notebook computer or desktop computer, and the like. The visual and audio content are streamed to the processor 116 via any of a variety of wireless communications, such as one or more of the IEEE 802.11a/b/g/n/ac/ad specifications (also known as the WiFi specifications) to wirelessly connect to a corresponding wireless access point. As the video data are received via the WLAN link, the processor 116 executes software stored in one or more memories (not shown) to process the received video data to render sequences of image frames that are then displayed at the near-eye display 112. Concurrently, the processor 116 executes software to continuously update the pose of the wireless handheld controllers 132, 134. The processor 116 may utilize imagery from one or more of the image sensors 118, 120, as well as depth information from one or more depth sensors (not shown), to determine spatial features in the environment of the HMD device 102, and use various visual telemetry techniques to facilitate determination of the pose. The current pose of the wireless handheld controllers 132, 134 typically is utilized by the processor 116 to control the perspective of a scene from which the sequences of images are rendered to provide an immersive VR/AR experience to the user.

In some embodiments, the VR/AR system 100 utilizes one or both wireless handheld controllers 132, 134 to enable a user to provide gesture commands and other user inputs to control the operation of the VR/AR system 100. As such, the handheld controllers 132, 134 typically include an internal IMU (not shown) with one or more positional/inertial sensors to detect the user's manipulation of the handheld controllers 132, 134 to detect such motion. The plurality of sensors 110 located on the handheld controllers 132, 134 are operated by the user to control objects within the VR/AR environment. The plurality of sensors 110 can use, but are not limited to, capacitive sensing and inductive sensing, and also can provide haptic feedback to allow the user a detailed level of control over objects in the VR/AR world as described herein.

Capacitive sensing permits the user to position one or more fingers in contact with or near the sensor 110, thus allowing the user to either position their finger a distance away from, or physically touch the sensor 110. Stated another way, the finger can hover over the sensor 110 without touching the sensor 110, or can touch the sensor 110 directly. Meanwhile, inductive sensing allows the user to apply varying levels of force or pressure by the user's fingers and hand to the sensor 110, which then generates accurate force/pressure data to be sent to the processor 116. In both capacitive and inductive sensing, the sensor 110 generates accurate position and force data due to the position and force/pressure of the user's fingers to the processor 116.

Haptic feedback improves the user's experience within the VR/AR environment by generating a physical response to the user's hand using a handheld controller 132. The physical response may be a clicking sensation, vibration, resistance to a button press, a bump when virtual objects are touched, and the like. Haptic feedback is generated by the handheld controller 132 when the user interacts with objects in the VR/AR environment. The user's control of objects, and their interactive VR/AR experience itself, is greatly enhanced by the user of capacitive sensing, inductive sensing, and haptic feedback.

Figure 2:
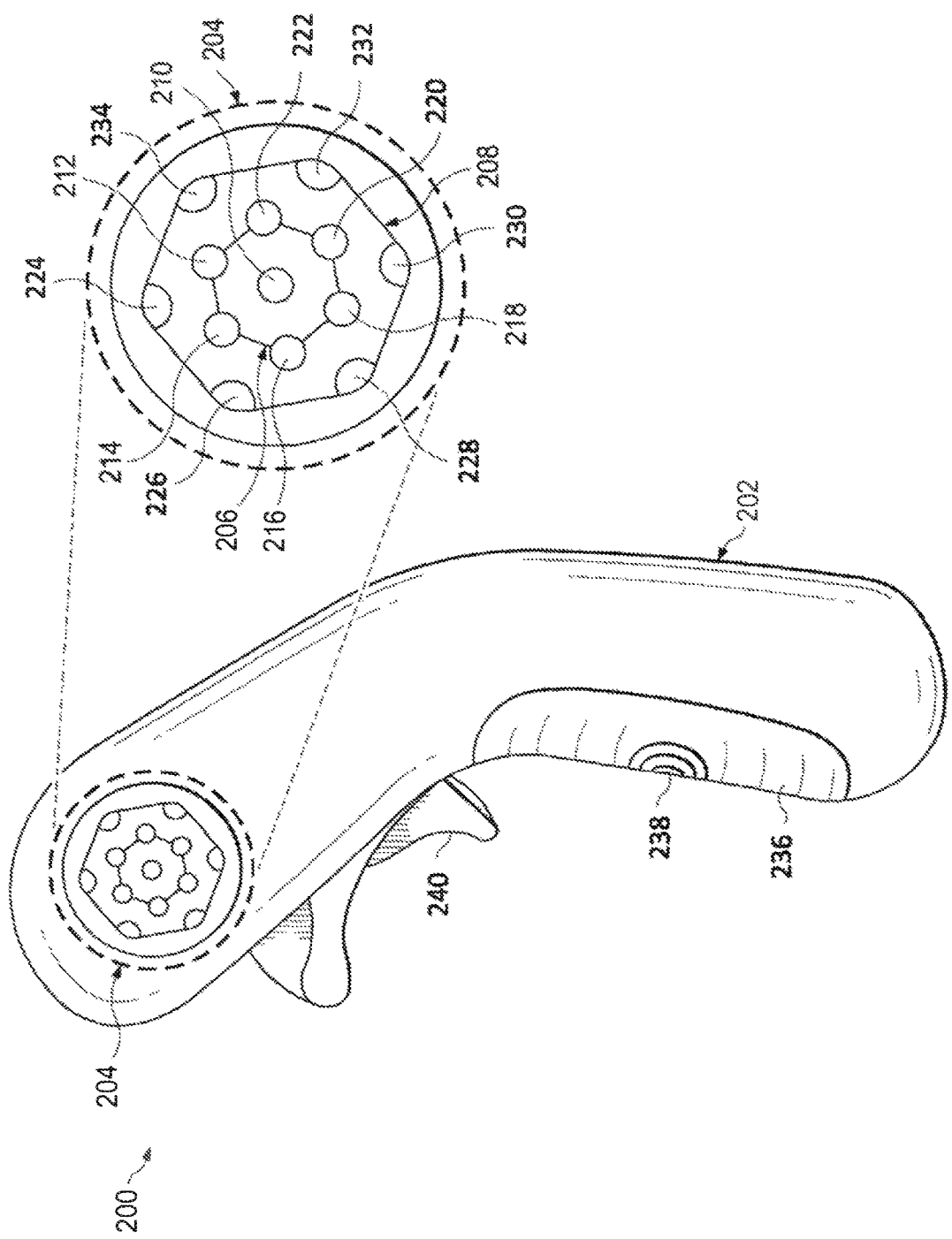
FIG. 2 is a diagram of the handheld controller of FIG. 1 with a plurality of finger and palm sensors in accordance with some embodiments.

FIG. 2 is a diagram of a handheld controller 200 with a plurality of finger and palm sensors 110 in accordance with some embodiments. The handheld controller 200 is one embodiment of the handheld controller 132, 134 of FIG. 1, but other embodiments are possible. The handheld controller 200 is used to manipulate objects in the VR/AR system 100 of FIG. 1 by using a plurality of sensors 110 positioned on the handheld controller 200.

The handheld controller 200 includes a hand grip 202 (grip), a touch pad 204, a grip pad 236, and a trigger 240. The touch pad 204 includes the plurality of sensors 110 that sense the presence of the fingers of the user. In at least some embodiments, the sensors 110 are positioned in geometric patterns on the touch pad 204 as described herein. In at least one embodiment, the output of the sensors 110 are electrically combined together to form aggregate sensor data that is sent to the processor 116 of FIG. 1 for further analysis in determining which sensor 110 was activated, and to calculate the position and motion of the user's fingers. In a number of embodiments, the grip pad 236 includes a grip sensor 238 that detects the presence of a palm of the hand of the user, and, in some embodiments, can also detect the amount of force the hand is applying to the grip pad 236. The grip sensor 238 can be a contact sensor, a capacitive sensor, or an inductive sensor with other embodiments possible. In at least some embodiments, the grip sensor 238 can also provide haptic feedback to the user's hand.

The touch pad 204 is positioned at a location on the handheld controller 200 to allow favorable finger control and easy user access to the sensors 110 as described herein. The touch pad 204 can include one region containing multiple sensors 110, or the touch pad 204 can be partitioned into multiple regions, with each region having dedicated sensors 110 positioned within. In at least some embodiments, the sensors 110 are positioned on the touch pad 204 in a circular, triangular, or rectangular pattern, while in other embodiments, the pattern is composed of two regions using concentric hexagonal shapes. Other patterns are possible and are not limiting. The sensors 110 are arranged in known patterns to allow the processor 116 to accurately triangulate the user's finger position. In the present embodiment shown in FIG. 2, one such pattern uses two concentric outer and inner hexagons 206, 208 respectfully, with 6 sensors deployed across each hexagon 206, 208 and 1 sensor in the center of the hexagons 206, 208.

In the embodiment shown in FIG. 2, the touch pad 204 includes 13 sensors 110, with sensor A 210 positioned at the center of the touch pad 204, sensors B, C, D, E, F, and G, 212, 214, 216, 218, 220, and 222, respectfully, positioned along the inner hexagon 208, and sensors H, I, J, K, L, and M, 224, 226, 228, 230, 232, and 234, respectfully, positioned along the outer hexagon 206. Each sensor 110 can be of the capacitive or inductive type, a mechanical switch, or another type of sensor or switching mechanism. Other embodiments are possible, with the present embodiment just one example.

In at least some embodiments, the output from the sensors 110 can be combined to form aggregate sensor data which is sent to the processor 116 for further calculation by an algorithm. The algorithm, as described in more detail in FIG. 5, uses the aggregate sensor data to determine the X and Y coordinates of the user's finger or fingers over the sensors 110. Combining the output of multiple sensors together enables the processor 116 to form an accurate estimate of the position of the hand and fingers around the sensors 110 in 3-D space. In some embodiments, output from the force/pressure sensors 110 are used to improve the accuracy of the capacitive sensors 110 by detecting when the user's finger is in contact with the capacitive sensor 110 or hovering just over it. Also in some embodiments, measurements from two or more separate regions can be analyzed to determine finger location and orientation.

In at least one embodiment, the sensors 110 on the touch pad 204 include hover, touch, and force sensors 110, while the grip sensor 238 includes a force sensor 110, and the trigger 240 incorporates the force sensor 110. The sensors 110 can be employed as a hover sensor by combining the measurements from the outer and inner hexagons 206, 208 respectfully and using the measurements to triangulate the location of the finger of the user. Other embodiments are possible, including any combination of hover, touch, and force sensors arranged individually or in patterns or regions on the touch pad 204 or grip 202 of the handheld controller 200.

Figure 3:
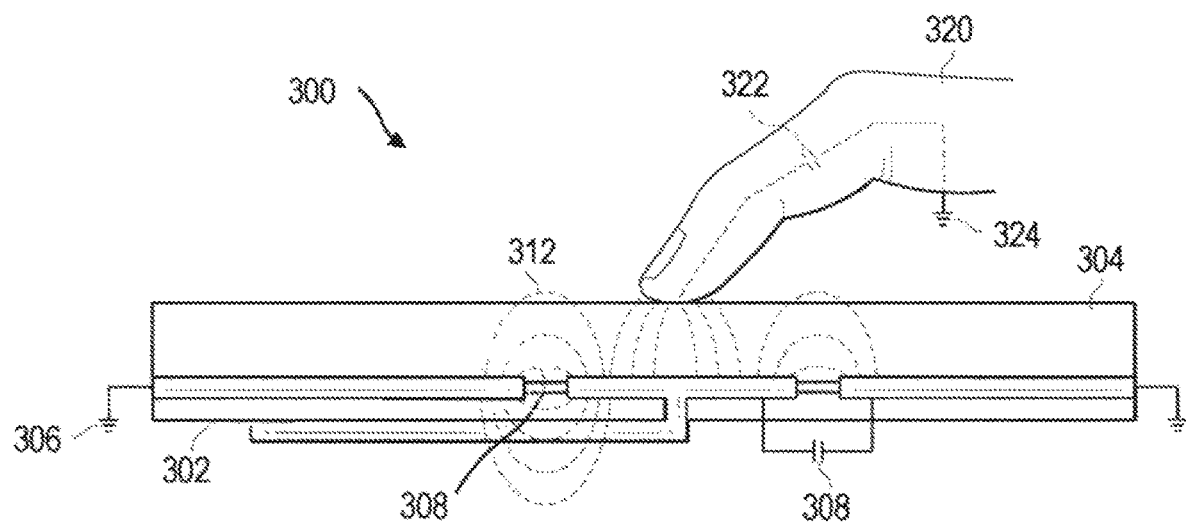
FIG. 3 is a diagram of a capacitive sensor to detect the presence of a finger when using the handheld controller of FIG. 2 in accordance with some embodiments.

FIG. 3 is a diagram of a capacitive sensor 300 to detect the presence of a finger 320 of the user when using the handheld controller 200 of FIG. 2 in accordance with some embodiments. The capacitive sensor 300 includes a printed circuit board structure made of a laminate layer 302, an overlay layer 304, and a ground plane 306, with the ground plane 306 sandwiched between the laminate layer 302 and the overlay layer 304. The ground plane 306 is electrically connected to earth ground. One or more base capacitors 308 are present within the ground plane 306. The base capacitor 308 emits an electromagnetic (EM) field 312 that penetrates the overlay layer 304 and extends a distance beyond a surface of the overlay layer 304. The finger 320 has an inherent touch capacitance 322 that is connected to a virtual ground 324 elsewhere in the body of the user. The virtual ground 324 is also electrically connected to earth ground. When the finger 320 is near the EM field 312, it begins to influence the EM field 312 due to the touch capacitance 322. As the finger 320 moves towards the base capacitor 308, it introduces changes to the EM field 312 magnitude, and continued movement towards the base capacitor 308 has a stronger effect on the EM field 312. The changes in the EM field 312 can be measured as changes in the current and voltage values sensed at the base capacitor 308, with the current and voltage values sent to the processor 116 of FIG. 1. In this manner, the presence and relative position of the finger 320 can be detected by the processor 116 or a processor located in the handheld controller 200. The capacitive sensor modality is used in both the hover and touch sensors 110.

In addition to measuring the changes to the base capacitor's 308 current and voltage values, in some embodiments the processor 116 tracks the current and voltage of the capacitive sensor 300 to establish a baseline voltage and current value. This occurs when the capacitive sensor 300 does not detect the presence of the finger 320. This process is called a "baseline tracking procedure". The baseline tracking procedure is used to monitor the capacitive sensor 300 for changes (drift) in ambient current and voltage values, and can thus detect variances to the baseline values. The baseline tracking procedure can also compensate for minor shifts in the baseline capacitance of the base capacitor 308. Also, the processor 116 can perform a recalibration function to reset the baseline current and voltage values of the capacitive sensor 300 when the capacitive sensor 300 does not detect the presence of the finger 320. These recalibration procedures can be performed periodically as defined by the processor 116. When the finger 320 is near the capacitive sensor 300, both the baseline tracking procedure and the periodic recalibration functions are disabled.

Figure 4:
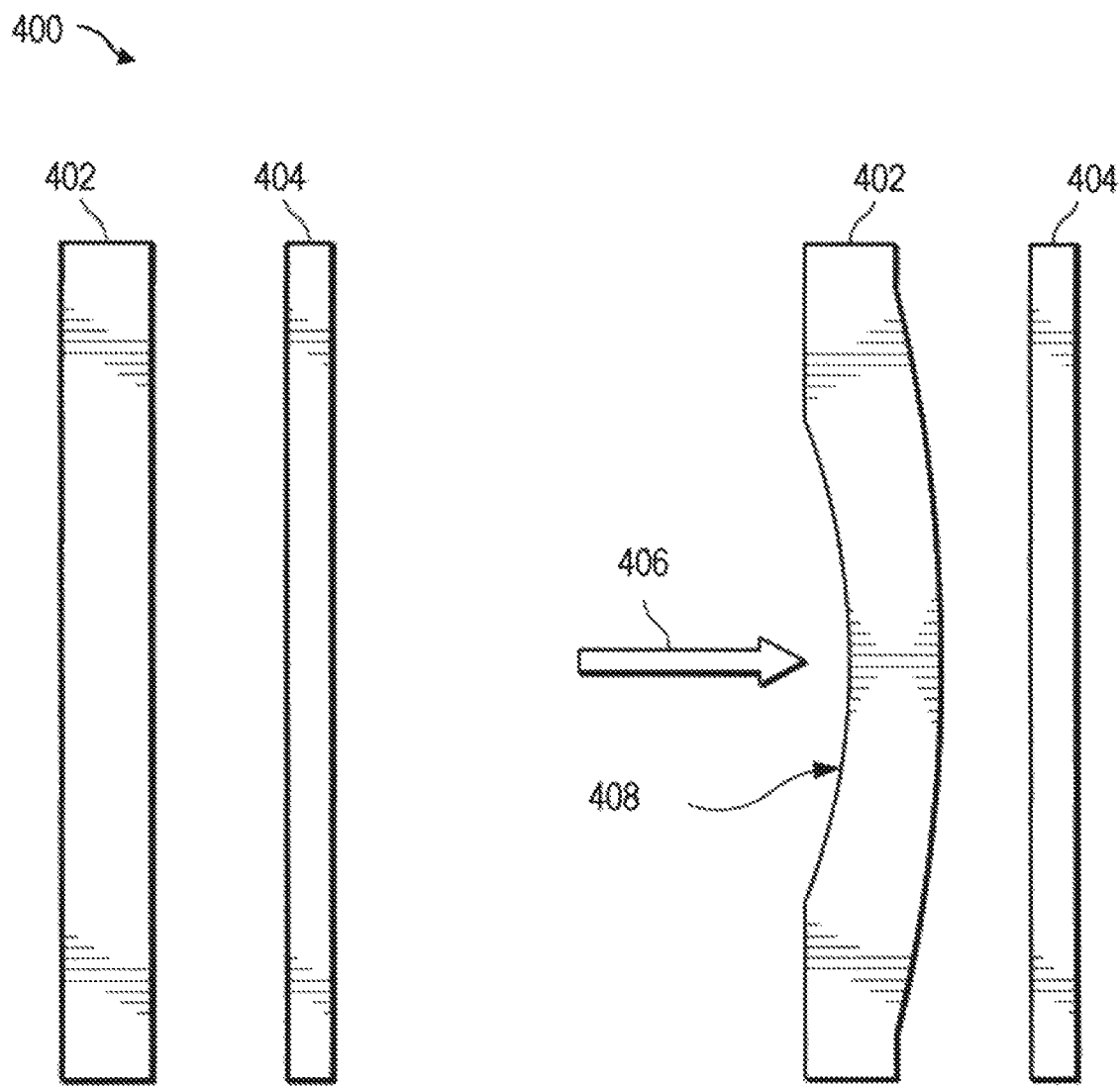
FIG. 4 is a diagram of an inductive sensor to detect the presence of a finger when using the handheld controller of FIG. 2 in accordance with some embodiments.

FIG. 4 is a diagram of an inductive sensor 400 to detect the presence of the finger 320 of the user when using the handheld controller 200 of FIG. 2 in accordance with some embodiments. The inductive sensor 400 is located on a printed circuit board and includes a metal plane 402 parallel to, and physically separated from, a coil 404 a small distance, where the coil 404 is an inductor with an inductance value. When an external force 406 is applied to the metal plane 402 by an object, such as when the finger 320 presses on the inductive sensor 400, the metal plane 402 undergoes a deflection 408 in relation to the coil 404. Due to the proximity of the metal plane 402 to the coil 404, the deflection 408 causes a change in the inductance of the coil 404. Based on Lenz's Law, the closer the metal plane 402 is to the coil 404, the lesser the inductance of the coil 404. The change in inductance value is detected by the processor 116 in the form of changes to the current and voltage through the coil 404. In this manner, the presence and force applied by the finger 320 can be detected by the processor 116 or a processor located in the handheld controller 200. The inductive sensor 400 thus is used to measure the variable force or pressure applied by the finger 320. The force/pressure sensor 110 employs an inductive sensor as described herein.

In some embodiments, the inductive sensor 400 also incorporates hysteresis functions as well as haptic feedback to the finger 320 of the user. Hysteresis, as applied to the present disclosure, introduces a lag or delay in response to a button or sensor being activated. Hysteresis prevents the unintentional rapid cycling or bouncing of a sensor in response to input such as the finger 320. Hysteresis aids the user's experience in the VR/AR environment by smoothing out the response of the sensors 110. Also, haptic feedback can recreate the sense of touch by applying forces, vibrations, or motion back to the user. This mechanical stimulation is used to aid in the creation and realism of virtual objects in a VR/AR environment.

Figure 5:
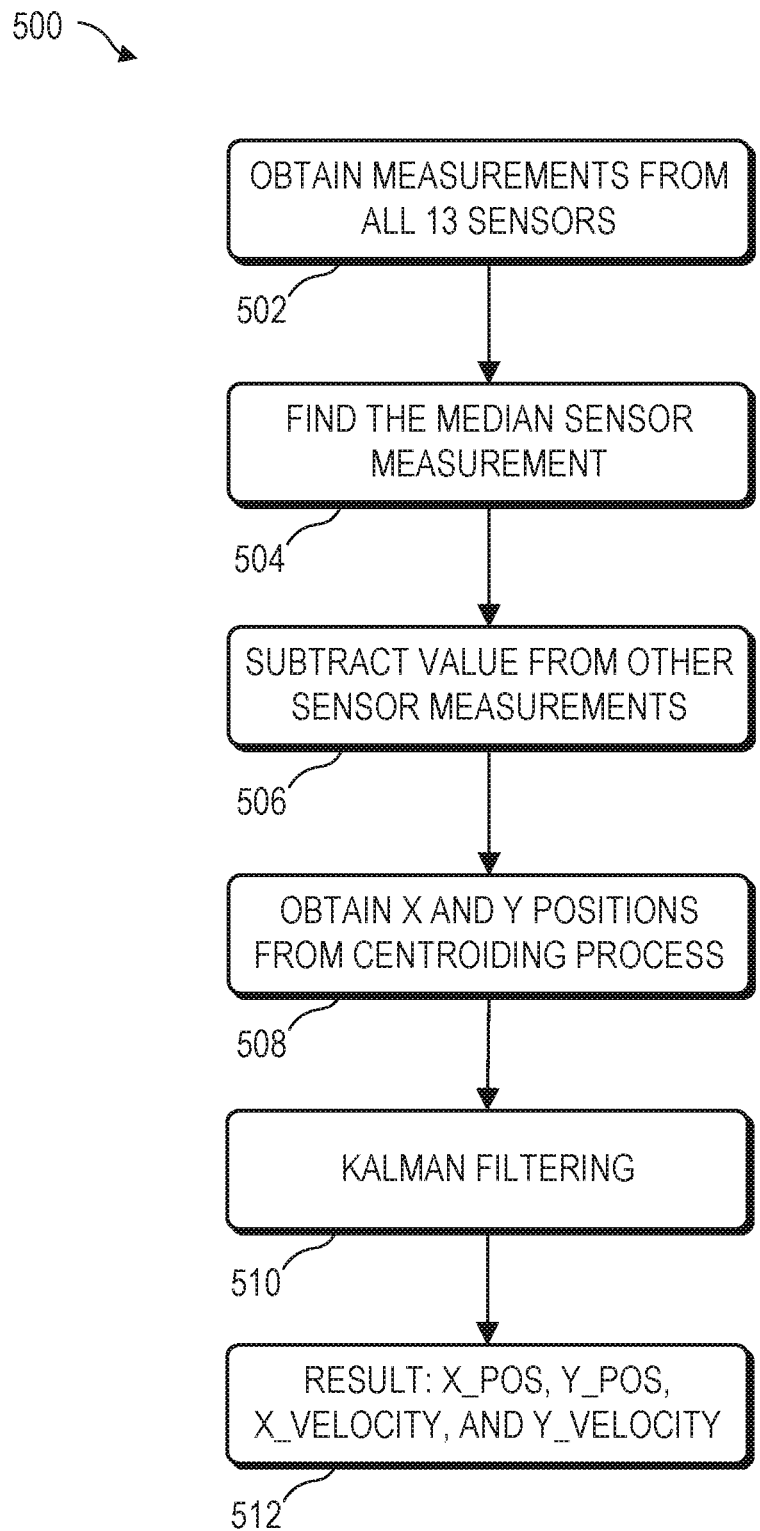
FIG. 5 is a flow diagram of a method for calculating the position of the finger of FIG. 3 based on multiple sensors as employed by the VR/AR system of FIG. 1 in accordance with some embodiments.

FIG. 5 is a flow diagram of a method 500 for calculating the position of the finger 320 of FIG. 3 of the user based on multiple sensors 110 as employed by the VR/AR system 100 of FIG. 1 in accordance with some embodiments. In the present embodiment, the method 500 uses capacitive sensors 300, but other embodiments employing other types of sensors are possible. The method 500 is but one embodiment of an algorithm for calculating the position of the finger 320 in relation to the handheld controller 200 of FIG. 2, and other embodiments are possible. In the present embodiment, the handheld controller 200 is used with the touch pad 204 having thirteen sensors 110 arranged in a concentric hexagonal pattern, and forming two distinct regions. The method 500 begins at block 502 where the VR/AR system 100 obtains measurements from the thirteen sensors via a wired or wireless communications path from the handheld controller 200. Next, at block 504, the method 500 determines the median, or $7^{th}$ largest, sensor measurement value based on the thirteen measurements. At block 506, the VR/AR system 100 subtracts the median sensor measurement value from each of the set of thirteen measurements. Next, at block 508, the 6 largest measurement values are used to perform a centroiding procedure to obtain the X- and Y-positions of the finger 320. The centroiding procedure includes calculating the geometric center of all of the measurements, and is represented by calculating the arithmetic mean of the 6 measurements. At block 510, the results of the centroiding procedure are passed through a filtering process via a Kalman filter to improve the resolution of the data and to minimize errors. Next, at block 512, the results from the centroiding and filtering procedures are presented as X_Position and Y_Position values. The X_Position and Y_Position values represent to location of the finger in relation to the thirteen sensors 110. Additionally, in some embodiments, movement data of the finger 320 over time can be calculated by the processor 116 by calculating the X_Velocity and Y_Velocity values for the finger 320 based on calculating and recording finger positions over time.

Figure 6:
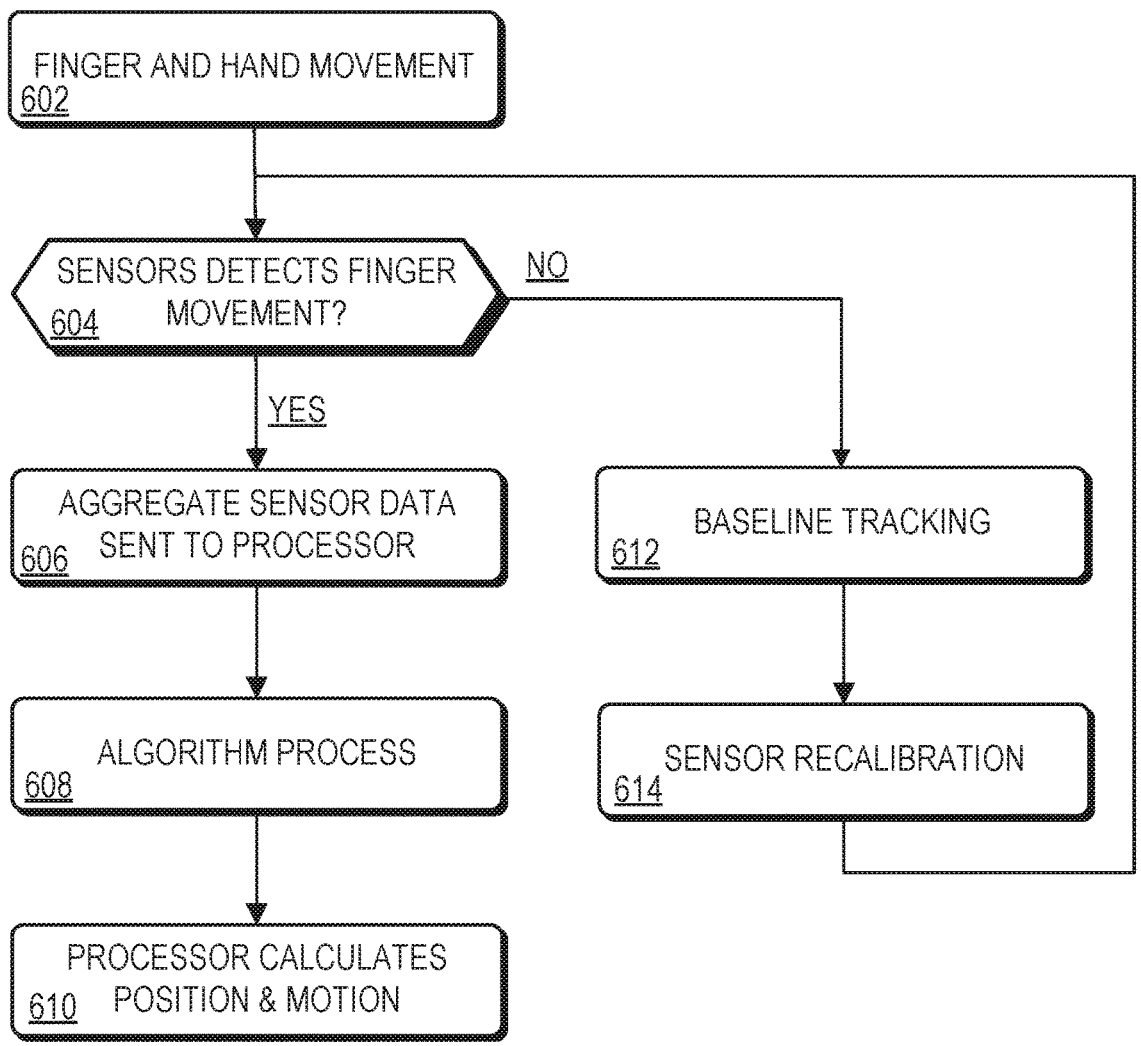
FIG. 6 is a flow diagram of a method for employing a plurality of sensors located on the handheld controller of FIG. 2 to sense the presence of one or more fingers of the user in the VR/AR system of FIG. 1 in accordance with some embodiments.

FIG. 6 is a flow diagram of a method 600 for employing a plurality of sensors 110 located on the handheld controller 200 of FIG. 2 to sense the presence of one or more fingers of the user in the VR/AR system 100 of FIG. 1 in accordance with some embodiments. The method 600 includes a user's hand and finger movement using the handheld controller 200 at block 602, where the handheld controller 200 employs sensors 110 arranged on the touch pad 204 in a geometric pattern as disclosed herein. Next, at decision block 604, the processor 116 determines whether any of the hover, touch, or force sensors detects any movement of the fingers 320. If one or more of the sensors 110 detects movement, the method 600 continues with collecting sensor measurement data at block 606. If, however, no finger 320 movement is detected by the sensors 110, the processor 116 begins the baseline tracking procedure at block 612 and the sensor recalibration function at block 614. Afterwards, the method 600 returns to the decision block 604 to await the detection of finger movement by the sensors 110.

Assuming the finger movement is detected at decision block 604, the method 600 continues with the sensor data from the hover, touch, and force sensors 110 combined to form aggregate sensor data at block 606. The data are sent to the processor 116. At block 608, the method 600 continues with the processor 116 applying an algorithm to the aggregate sensor data. The algorithm can be the method 500 of FIG. 5 or another process for analyzing the sensor measurement data. Next, at block 610, the method 600 continues with the processor 116 calculating the estimated position of the finger 320 of the user using the X_Position and Y_Position variables that are derived from the aggregate sensor data. Additionally, the method 600 can also calculate the motion of the finger 320 by using current and historical data from previous measurements to determine the X_Velocity and Y_Velocity of the fingers 320 over time as described herein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    employing a plurality of sensors on a handheld controller,
        wherein each of the plurality of sensors comprises one of a hover, touch, and force/pressure sensor, and
        wherein the plurality of sensors including at least one hover sensor, and at least one of a touch sensor and a force/pressure sensor;
    generating concurrently, by the plurality of sensors, sensor data associated with the position of a user's hand and finger in relation to the handheld controller;
    combining the sensor data from the plurality of sensors to form aggregate sensor data;
    sending the aggregate sensor data to a processor; and
    generating an estimated position of the user's hand and fingers in 3 dimensions based on the aggregate sensor data.

2. The method of claim 1, wherein at least one hover and touch sensor uses capacitive sensing to sense the position of the user's hand and fingers.

3. The method of claim 1, wherein the force/pressure sensor uses inductive sensing to sense when the user's hand and fingers are in contact with the force/pressure sensor.

4. The method of claim 1, wherein the plurality of sensors includes a capacitive sensor, and wherein the processor performs a baseline tracking procedure to establish baseline current and voltage values for the capacitive sensor by:
  monitoring the capacitive sensor for a change in one or more of a current and a change in voltage;
  compensating for a shift in a baseline capacitance by detecting a change to a baseline value for the current or change to a baseline value for the voltage;
  performing a recalibration to reset the baseline current and the baseline voltage values of the capacitive sensor when the processor does not detect the presence of the user's finger; and
  disabling the recalibration when the user's finger is near the capacitive sensor.

5. The method of claim 1, wherein the processor combines the output of force/pressure sensors with output from one of the hover and touch sensors to detect the presence of the user's fingers.

6. The method of claim 1, further comprising a force/pressure sensor positioned on a trigger of the handheld controller, wherein the force/pressure sensor provides a continuous stream of sensor data indicative of a force the user's hand and fingers applies to the trigger.

7. The method of claim 1, wherein at least one of the plurality of sensors employs haptic feedback to the user's hand and fingers.

8. The method of claim 1, wherein the touch pad is partitioned into two or more regions, wherein each region comprises at least one of the plurality of sensors.

9. The method of claim 8, wherein the regions are hexagonal in shape.

10. A method comprising:
  employing a plurality of sensors on a handheld controller, wherein each of the plurality of sensors comprises one of a hover, touch, and force/pressure sensor, and wherein the plurality of sensors including at least one hover sensor, and at least one of a touch sensor and a force/pressure sensor;
  positioning the plurality of sensors in a pattern on a touch pad located on the handheld controller;
  generating concurrently, by the plurality of sensors, sensor data associated with the position of a user's hand and finger in relation to the handheld controller;
  combining the sensor data from the plurality of sensors to form aggregate sensor data;
  sensing, by at least three of the plurality of sensors, contact by at least one of the user's fingers;
  sending the aggregate sensor data to a processor; and
  calculating, by the processor, a position of the finger in 3 dimensions, wherein the position of the finger is determined by triangulation using the aggregate sensor data.

11. The method of claim 10, wherein each of the plurality of sensors uses one of capacitive sensing and inductive sensing.

12. The method of claim 10, wherein the algorithm comprises:
  obtaining a set of measurements from N number of sensors of the plurality of sensors;
  subtracting the median measurement value from each measurement;
  identifying a set of (N−1)/2 measurement values;
  calculating the arithmetic mean values of the set of (N−1)/2 measurement values; and
  forming X_Position and Y_Position values from the arithmetic mean values.

13. The method of claim 10, further comprising a force/pressure sensor positioned on a trigger of the handheld controller, wherein the force/pressure sensor provides a continuous stream of sensor data indicative of a force the user's hand and fingers applies to the trigger.

14. An apparatus comprising:
  a handheld controller;
  a touch pad located on the handheld controller;
  a plurality of hover, touch, and force/pressure sensors positioned on the touch pad, wherein the sensors sense when a user's hand and fingers is in contact with the sensors;
  aggregate sensor data formed by the plurality of sensors, wherein the aggregate sensor data are comprised of sensor data generated concurrently from the plurality of sensors; and
  a processor, using the aggregate sensor data, configured to:
    generate an estimated position of the user's hand and fingers in 3 dimensions based on the aggregate sensor data.

15. The apparatus of claim 14, wherein each of the plurality of sensors uses one of capacitive sensing and inductive sensing.

16. The apparatus of claim 14, further comprising a grip of the handheld controller employing at least one force/pressure sensor.

17. The apparatus of claim 14, wherein at least one of the plurality of sensors employs haptic feedback to the user's hand and fingers.

18. The apparatus of claim 14, wherein the touch pad enables at least three sensors to be in contact with the user's fingers, and wherein the at least three sensors are used to triangulate a position of at least one finger of the user's fingers.

19. The apparatus of claim 14,
  wherein the plurality of sensors positioned on the touch pad is comprised of one or more capacitive sensors arranged in a double hexagonal pattern, and
  wherein the double hexagonal pattern is comprised of an outer hexagon and an inner hexagon in a concentric arrangement, and
  wherein one of the plurality of sensors is located at a center of the double hexagonal pattern.

20. The apparatus of claim 19, wherein the aggregate sensor data are formed by combining capacitance sensing measurements from at least one sensors associated with the outer hexagon and one sensor associated with the inner hexagon.

* * * * *